US006991265B2

(12) United States Patent
Walmsley et al.

(10) Patent No.: US 6,991,265 B2
(45) Date of Patent: Jan. 31, 2006

(54) DEVICE FOR GRIPPING A PIPE OR BAR

(75) Inventors: Owen Walmsley, Roy Bridge (GB); Robert Emmett, Wray (GB)

(73) Assignee: BSW Limited (GB)

(*) Notice: Subject to any disclaimer, the term of this patent is extended or adjusted under 35 U.S.C. 154(b) by 382 days.

(21) Appl. No.: 10/404,898

(22) Filed: Apr. 1, 2003

(65) Prior Publication Data

US 2004/0094957 A1 May 20, 2004

Related U.S. Application Data

(63) Continuation of application No. PCT/GB01/04411, filed on Oct. 4, 2001.

(30) Foreign Application Priority Data

Oct. 4, 2000 (GB) ............................................ 0024278

(51) Int. Cl.
*F16L 37/00* (2006.01)

(52) U.S. Cl. ....................... 285/316; 285/307; 285/322; 285/374; 285/403

(58) Field of Classification Search ................. 285/305, 285/307, 232, 315, 316, 322, 323, 374, 403
See application file for complete search history.

(56) References Cited

U.S. PATENT DOCUMENTS

| | | | | |
|---|---|---|---|---|
| 1,337,288 A | 4/1920 | Stichler | | |
| 2,503,495 A | 4/1950 | Koester | ................... | 251/149.6 |
| 2,702,202 A | 2/1955 | Kaiser | | |
| 5,284,369 A | 2/1994 | Kitamura | .................... | 285/322 |
| 5,445,358 A | 8/1995 | Anderson | ................ | 251/149.6 |
| 5,593,239 A | 1/1997 | Sallee | ..................... | 403/109.3 |
| 5,653,480 A | 8/1997 | Mine et al. | ................. | 285/322 |
| 5,893,391 A | 4/1999 | Jenski, Jr. | ............. | 134/614.04 |
| 6,152,496 A | 11/2000 | Kouda | ........................ | 285/316 |
| 6,412,829 B1 | 7/2002 | Persson | ...................... | 285/316 |

FOREIGN PATENT DOCUMENTS

| | | |
|---|---|---|
| DE | 29704444 U | 4/1997 |
| EP | 0735306 A | 10/1996 |
| JP | 3-140696 | 6/1991 |

*Primary Examiner*—James M. Hewitt
(74) *Attorney, Agent, or Firm*—Gauthier & Connors LLP

(57) ABSTRACT

A device for gripping the external wall surface of a pipe or bar. The device includes a tubular body having at least one end open for insertion of a pipe or bar, and a cage with balls or rollers cooperating with a first tapered internal wall part of the body. A resilient mechanism pushes the cage in an axial direction to cause the balls or rollers to grip the external wall of an inserted pipe or bar. The device also has a compressible member located within the body and cooperating with a second tapered inner wall part of the body and movable relative thereto when increased fluid pressure is present within the body. Under increased pressure it also grips the external wall of the inserted pipe or bar.

9 Claims, 1 Drawing Sheet

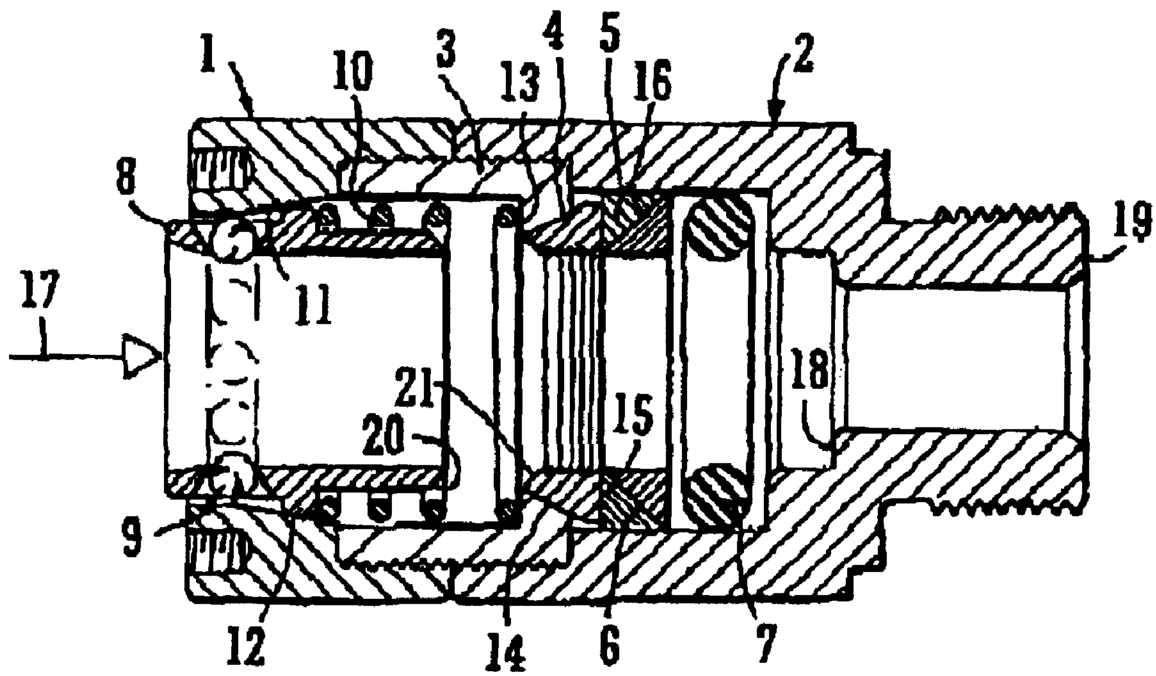
1
10
3
13
4
5
16
2
8
19
11
17
21
18
15
20
9
12
14
6
7

DEVICE FOR GRIPPING A PIPE OR BAR

This application is a continuation of PCT/GB01/04411 filed Oct. 4, 2001.

FIELD OF THE INVENTION

THIS INVENTION concerns a device for gripping the external wall surface of a pipe or bar and particularly, though not exclusively, to a connector adapted to receive and retain a pipe end for fluid connection to another pipe end or to a supply outlet.

BACKGROUND OF THE INVENTION

Devices are known for gripping the external wall surface of a pipe, which include a body having an internal tapered wall part, and a cage with balls or rollers cooperating with the tapered wall part thus to move inwardly and grip the pipe wall to prevent its removal from the device. In such devices the cage is spring-loaded in a direction to cause the balls or rollers to grip the wall but in many such examples when fluid pressure is applied within the device there is a tendency for the pipe to slip and move longitudinally by as much as 5 mm or more. This movement causes the balls or rollers to become partially embedded in the pipe wall, which makes it difficult subsequently to remove the pipe from the device and it is often a disadvantage that the external wall of the pipe is partially deformed or scored by the balls or rollers.

SUMMARY OF THE INVENTION

An object of the present invention is to provide a gripping device such as a pipe connector wherein the aforementioned disadvantage is substantially avoided.

According to the present invention there is provided a device for gripping the external wall surface of a pipe or bar, comprising a tubular body having at least one end open for insertion of a pipe or bar, a cage within the tubular body with balls or rollers cooperating with a first tapered internal wall part of the body, resilient means to push the cage in an axial direction to cause the balls or rollers to grip the external wall surface of an inserted pipe or bar, and a compressible member located within the body and cooperating with a second tapered internal wall part of the body and movable relative thereto when increased fluid pressure is present within the body thus also to grip the external wall surface of the inserted pipe or bar.

Preferably the compressible member has a contact surface adapted to make substantially full circumferential contact with the external wall surface of the inserted pipe or bar.

The device may include a sealing ring adapted to form a seal between the internal wall of the body and the external wall surface of the inserted pipe or bar.

The cage and the compressible member may have respective cooperating faces for simultaneous axial movement within the body.

The compressible member may be a circumferentially split ferrule.

The body may comprise axially aligned separate body parts each threadedly engageable with a co-axial spring retaining member housed within the body.

The body may contain an anti-extrusion ring axially aligned with the circumferentially split ferrule, and a tapered ring located between the anti-extrusion ring and the circumferentially split ferrule.

The body may include an annular shoulder against which an end of the inserted pipe or bar may be located.

BRIEF DESCRIPTION OF THE DRAWING

An embodiment of the invention will now be described, by way of example only, with reference to the accompanying drawing which is a cross-section through a pipe connector made in accordance with the invention.

DETAILED DESCRIPTION OF THE INVENTION

The connector comprises a first tubular body part 1 having a first tapered internal wall part 11. Threadedly engaged within one end of the body part 1 is a spring retaining member 3. An external thread of the retaining member 3 receive a second tubular body part 2.

A ball cage 8 is located co-axially within the body part 1 and includes an outwardly directed circumferential flange 12 which, together with an inwardly directed flange 13 on the spring retaining member 3, retains a coil spring 10 whereby the cage 8 is pushed in an axial direction to cause a number of ball bearings 9 to ride radially inwardly on the first tapered internal wall part 11. The cage is retained within the body part 1 by engagement of the flange 12 with the wall part 11.

The flange 13 of the spring retaining member 3 has a tapered internal face 14 against which is located a corresponding tapered external face of a circumferentially split ferrule 4 located within the body part 2 co-axially therewith.

Abutting an end face 15 of the ferrule 4 axially remote from the cage 8 is a metal ring 5 having a tapered face 16 against which is located a corresponding tapered face of an anti-extrusion ring 6 preferably, though not exclusively, of PTFE.

Axially displaced from the anti-extrusion ring 6 is an 'O' ring 7 which in use forms a pressure tight seal between the internal wall of the body part 2 and a pipe to be inserted into the connector as will be described.

It can be seen that the body part 1, ball cage 8, spring retainer 3 and spring 10 may be pre-assembled, as can the body part 2, the 'O' ring 7, the rings 5 and 6 and the split ferrule 4, whereupon joining of the two body parts forms the final assembly.

The materials from which the pars of the device are constructed are typical of such devices. For example, the body parts 1 and 2 may be of steel or brass; the spring-retainer 3 may be of steel; the ball bearings 9 may be of hardened steel, the split ferrule 4 may be of hardened steel segments with elastomeric inserts, the 'O' ring 7 may be of natural or synthetic rubber; and the ring 5 may be of brass.

Typically, a connecting device as described may be used in conjunction with pipes of a diameter up to 50 mm with internal pressures in the region of 3,000 to 6,000 psi, but is typically tested to a pressure in excess of 20,000 psi.

The connector is used by inserting a pipe end in the direction of arrow 17 which causes the ball cage 8 to move against the spring 10 such that the ball bearings 9 ride along the external wall of the inserted pipe. An annular shoulder 18 preferably, though not essentially, forms an end stop for the pipe whereupon the pipe is retained by the pressure of spring 10 acting to cause ball bearings 9 to form a grip upon the external wall of the inserted pipe but with insufficient pressure to become embedded therein.

In the present example the body part 2 has an end portion 19 which may be connected to another such connecting device or to a port for the transportation of pressurised fluid.

When the fluid pressure increases within the body part 2 the 'O' ring 7 is forced against rings 6 and 5, thus in turn causing the split ferrule 4 to ride inwardly on the tapered internal face 14 of the spring retaining member 3 to be compressed thereby and firmly to grip the external wall of the pipe substantially around the full circumference thereof. This gripping action serves to prevent any tendency of the pipe, under pressure, to move in a direction opposite to arrow 17 which would otherwise cause the ball bearings 9 to become embedded in the pipe wall. In a typical conventional pipe connector having only a ball or roller cage, such movement may be as great as 5 mm in the axial direction whereas with the present arrangement any such movement is expected to be negligible and certainly no greater than 1 mm. This is of considerable advantage when constructing, for example, hydraulic circuits.

Since the balls 9 are prevented from excessively gripping and thus deforming the pipe wall, subsequent removal of the pipe from the connector is facilitated by introducing a removal tool which pushes the cage 8 against the spring 10, and it will be seen that the cage 8 and split ferrule 4 have cooperating tapered end faces 20 and 21 respectively, such that the removal tool uses the cage to abut the ferrule and move it in the direction of arrow 17 thus to expand and release the pipe.

It will be appreciated that the circumferentially split ferrule 4 is clear of the pipe during initial insertion and only grips the external wall thereof when compressed by the tapered face 14 upon the application of an increased fluid pressure within the device.

A further advantage of the present device is that it is the internal fluid pressure which provides the gripping action and no additional tools or the like are needed for tightening the device, unlike some types of pipe connector where relative rotation of the parts is needed to grip the pipe. The device is thus self-gripping with minimal linear slip of the pipe in use and considerably reduced deformation or surface damage to the pipe wall in view of the substantially full circumferential contact between the latter and the split ferrule.

In use, any further increase in internal fluid pressure serves only to cause the split ferrule 4 to grip the pipe more firmly.

Although the ferrule 4 is illustrated as having an internal toothed gripping surface, in some cases a smooth internal surface is sufficient.

Since the ball bearings do not excessively grip the pipe wall the connector is re-usable with, perhaps, the split ferrule 4 being the only part requiring replacement in some cases.

Although the foregoing description refers to the device as a pipe connector nevertheless, with a different formation of body part 2 it may serve as a pipe or bar retaining device, pressurised fluid being introduced into the body part 2 such as to force the 'O' ring 7 and the rings 6 and 5 towards the split ferrule 4. The pressurised fluid may be introduced through a port in the wall of the body part 2 or, in the case of a pressurised pipe, by way of an aperture in the pipe wall.

What is claimed is:

1. A device for gripping the external wall surface of a pipe or bar, comprising a tubular body having at least one end open for insertion of a pipe or bar, a cage with balls or rollers cooperating with a first tapered internal wall part of the body, the cage contacting and being disposed within resilient means, said resilient means pushes the cage in an axial direction to cause the balls or rollers to grip the external wall of an inserted pipe or bar, and a compressible member located within the body and cooperating with a second tapered internal wall part of a spring retaining member house within the body and movable relative thereto when increased fluid pressure is present within the body thus also to grip the external wall of the inserted pipe or bar.

2. A device according to claim 1, wherein the compressible member has a contact surface adapted to make substantially full circumferential contact with the external wall surface of the inserted pipe or bar.

3. A device according to claim 1, including a sealing ring adapted to form a seal between the internal wall of the body and the external wall surface of the inserted pipe or bar.

4. A device according to claim 1, wherein the cage and the compressible member have respective co-operating faces for simultaneous axial movement within the body.

5. A device according to claim 1, wherein the compressible member is a circumferentially split ferrule.

6. A device according to claim 5, wherein the circumferentially split ferrule comprises hardened steel segments with elastomeric inserts.

7. A device according claim 1, wherein the body comprises axially aligned separate body parts each threadedly engageable with the spring retaining member housed within the body.

8. A device according to claim 5, wherein the body contains an anti-extrusion ring axially aligned with the circumferentially split ferrule, and a tapered ring located between the anti-extrusion ring and the circumferentially split ferrule.

9. A device according to claim 1, wherein the body includes an annular shoulder against which an end of the inserted pipe or bar may be located.

* * * * *